United States Patent
Fischer (10) Patent No.: US 10,502,166 B2
(45) Date of Patent: Dec. 10, 2019

(54) EGR SYSTEM WITH PARTICLE FILTER AND WASTEGATE

(71) Applicant: TENNECO GMBH, Edenkoben (DE)

(72) Inventor: Michael Fischer, Mainz (DE)

(73) Assignee: Tenneco GmbH, Edenkoben (DE)

( * ) Notice: Subject to any disclaimer, the term of this patent is extended or adjusted under 35 U.S.C. 154(b) by 0 days.

(21) Appl. No.: 15/574,660

(22) PCT Filed: May 25, 2016

(86) PCT No.: PCT/EP2016/061791
§ 371 (c)(1),
(2) Date: Nov. 16, 2017

(87) PCT Pub. No.: WO2016/189028
PCT Pub. Date: Dec. 1, 2016

(65) Prior Publication Data
US 2018/0128213 A1    May 10, 2018

Related U.S. Application Data

(63) Continuation-in-part of application No. 14/721,288, filed on May 26, 2015, now Pat. No. 10,415,513.

(30) Foreign Application Priority Data

May 26, 2015   (DE) .......................... 10 2015 108 223

(51) Int. Cl.
*F02M 26/04*    (2016.01)
*F02M 26/05*    (2016.01)
(Continued)

(52) U.S. Cl.
CPC ............. *F02M 26/04* (2016.02); *F02B 37/18* (2013.01); *F02M 26/05* (2016.02); *F02M 26/06* (2016.02);
(Continued)

(58) Field of Classification Search
CPC ........ F02M 26/04; F02M 26/05; F02M 26/06; F02M 26/07; F02M 26/22; F02M 26/35; F02M 26/44
See application file for complete search history.

(56) References Cited

U.S. PATENT DOCUMENTS 5,671,600 A    9/1997  Pischinger et al.
7,451,750 B1   11/2008 Fox et al.
(Continued)

FOREIGN PATENT DOCUMENTS

DE    102009022938 A1    6/2010
DE    102009014277 A1    9/2010
(Continued)

OTHER PUBLICATIONS

International Preliminary Report on Patentability, corresponding to PCT/EP2016/061791, dated Nov. 28, 2017, 6 pages, English translation.

*Primary Examiner* — Jason D Shanske
*Assistant Examiner* — Jessica L Kebea
(74) *Attorney, Agent, or Firm* — Harness, Dickey & Pierce, P.L.C.

(57) ABSTRACT

The invention relates to an exhaust gas conducting system for a gasoline engine, comprising an exhaust gas line which can be connected to an exhaust manifold of the gasoline engine, an inlet line which can be connected to an intake manifold of the gasoline engine, and a turbine which is arranged in the exhaust gas line. At least one exhaust gas recirculation line is provided which opens into the inlet line, and the exhaust gas line has a bypass line which opens into the exhaust gas line downstream of the turbine, wherein a) the exhaust gas recirculation line branches off upstream of the turbine, and the bypass line branches off to the exhaust gas recirculation line or b) the bypass line branches off upstream of the turbine, and the exhaust gas recirculation (Continued)

line branches off to the bypass line, wherein c) at least one particle filter is arranged in the exhaust gas recirculation line or in the bypass line upstream of the exhaust gas recirculation line or in the exhaust gas line upstream of the exhaust gas recirculation line.

14 Claims, 3 Drawing Sheets

(51) Int. Cl.
    F02M 26/06    (2016.01)
    F02M 26/07    (2016.01)
    F02M 26/22    (2016.01)
    F02M 26/35    (2016.01)
    F02M 26/44    (2016.01)
    F02M 37/18    (2006.01)
    F02M 35/02    (2006.01)
    F02B 37/18    (2006.01)

(52) U.S. Cl.
    CPC ............ *F02M 26/07* (2016.02); *F02M 26/22* (2016.02); *F02M 26/35* (2016.02); *F02M 26/44* (2016.02); *F02M 35/02* (2013.01)

(56) References Cited

U.S. PATENT DOCUMENTS

| | | | | |
|---|---|---|---|---|
| 8,931,256 | B2* | 1/2015 | Moravec | ................ F02M 26/43 60/285 |
| 2008/0178843 | A1 | 7/2008 | Duffy et al. | |
| 2008/0250775 | A1 | 10/2008 | Bruck | |
| 2010/0132346 | A1 | 6/2010 | Genoist et al. | |
| 2011/0072788 | A1 | 3/2011 | Ruona et al. | |
| 2011/0302918 | A1 | 12/2011 | Vollmer et al. | |
| 2012/0042849 | A1* | 2/2012 | Sangkyu | ................ F02B 37/013 123/294 |
| 2013/0008162 | A1 | 1/2013 | Ruona et al. | |
| 2016/0097320 | A1* | 4/2016 | Ohrem | ................... F02M 26/05 60/599 |
| 2016/0265485 | A1* | 9/2016 | Massard | ................ F02D 41/005 |
| 2017/0335748 | A1* | 11/2017 | Zhang | .................... F02M 26/05 |
| 2017/0335805 | A1* | 11/2017 | Zhang | ....................... F01P 3/20 |
| 2018/0128145 | A1* | 5/2018 | Uhrich | ................... F02M 26/21 |

FOREIGN PATENT DOCUMENTS

| | | |
|---|---|---|
| DE | 102010046747 A1 | 3/2011 |
| DE | 102012021882 A1 | 5/2014 |
| DE | 102013003701 A1 | 9/2014 |
| DE | 102013008426 A1 | 11/2014 |
| EP | 1405995 A1 | 4/2004 |
| EP | 2151570 A1 | 2/2010 |
| EP | 2395224 A2 | 12/2011 |
| EP | 2194351 B1 | 5/2012 |
| EP | 2669496 A1 | 12/2013 |
| FR | 2894624 A1 | 6/2007 |
| FR | 2992358 A1 | 12/2013 |
| JP | H07259654 A | 10/1995 |
| WO | WO-2008/127755 A2 | 10/2008 |
| WO | WO-2016/102798 A1 | 6/2016 |

* cited by examiner

EGR SYSTEM WITH PARTICLE FILTER AND WASTEGATE

CROSS-REFERENCE TO RELATED APPLICATIONS

This application is a U.S. National Phase of International Application No. PCT/EP2016/061791, filed May 25, 2016 and published in German as WO 2016/189028 A1 on Dec. 1, 2016. This application claims the priority to U.S. patent application Ser. No. 14/721,288, and German Patent Application No. 10 2015 108 223.3, both filed on May 26, 2015. The entire disclosures of all of the above applications are incorporated herein by reference.

FIELD

The disclosure relates to an exhaust gas conducting system for a gasoline engine, comprising an exhaust gas line which can be connected to an exhaust manifold of the gasoline engine, an inlet line which can be connected to an intake manifold of the gasoline engine, and a turbine which is arranged in the exhaust gas line.

BACKGROUND

This section provides background information related to the present disclosure which is not necessarily prior art.

An exhaust gas recirculation system for diesel engines is known from U.S. Pat. No. 5,671,600 A. Provided at the exhaust gas outlet or at the exhaust gas line respectively is a particle filter, to which an exhaust gas recirculation line is connected. The exhaust gas recirculation line opens upstream of a charge-air compressor in the inlet line. Provided inside the exhaust gas recirculation line is a valve for modifying the exhaust gas mass flow. The particle filter serves to protect the charge-air compressor or the charge-air cooler respectively against dirt contamination.

A particle filter in the main exhaust gas flow of a gasoline engine is known from DE 10 2012 021 882 A1. Unlike the diesel engine arrangement, the particle filter regenerates to the greatest possible extent without additional active measures, i.e. the particle mass which has been retained up to that point (soot particles with attached or embedded hydrocarbons) combusts under normal gasoline engine peripheral conditions, essentially to form CO2 or H2O respectively. For this purpose, sufficiently high exhaust gas temperatures of more than 500° C. as well as oxygen are required, for combustion. This exhaust gas temperature is attained soon after the start of the engine, in the most widely differing operating ranges of the gasoline engine. Since the majority of gasoline engines are stoichiometrically operated, the oxygen content in the exhaust gas may be too low for a complete combustion of the particle mass contained in the filter. In this situation, conventional deceleration fuel cut-off phases of the gasoline engine are of assistance, in which, due to the absence of the load requirement from the driver, the engine injection is switched off for reasons of fuel consumption. Since the engine, with a gear engaged as an engine brake, results in the reduction of the vehicle's speed, clean air is flushed through the exhaust system by the slow-combusting engine. This non-combusted air impacts on the particles in the particle filter, heated previously by the engine exhaust gas. When an adequate temperature is reached, these particles catch fire and combust to form gases which can escape through the particle filter, cleaning the particle filter as a result.

Additional measures, such as a secondary air system, in order to achieve the active regeneration of the particle filter by an air surplus, are known from DE 10 2013 003 701 A1, DE 10 2013 008 426 and WO 2008 127 755 A2.

DE 10 2009 014 277 A1 describes a device for the operation of a diesel engine having an exhaust gas line and an exhaust gas recirculation line, which connects to an inlet line. The exhaust gas recirculation line can optionally be connected to the exhaust gas system in a regeneration mode of the diesel particle filter located in the exhaust gas recirculation line by means of a three-way valve, wherein, during regular operation, the exhaust gas recirculation line is in flow connection with the inlet line by way of said three-way valve for the purpose of exhaust gas return.

DE 10 2010 046 747 A1 describes a method for the operation of a gasoline engine having a three-way catalytic converter and downstream particle filter. For the purpose of regeneration of the particle filter located in the exhaust gas line, a bypass is provided, which is routed past the three-way catalytic converter, wherein an air pump for the supply of secondary air is provided inside this bypass for the purpose of the regeneration of the particle filter. At the same time, in this case, a low-pressure exhaust gas recirculation line is supplied with secondary air.

EP 2 194 351 B1 describes an exhaust gas cooler for a diesel engine.

SUMMARY

This section provides a general summary of the disclosure, and is not a comprehensive disclosure of its full scope or all of its features.

The disclosure is based on the object of configuring and arranging an exhaust gas conducting system for a gasoline engine in such a way that an improved regeneration of the particle filter is attained.

The object is achieved according to the disclosure in that at least one exhaust gas recirculation line is provided which opens into the inlet line, and that the exhaust gas line has at least one bypass line which opens into the exhaust gas line downstream of the turbine, wherein a) the exhaust gas recirculation line branches off upstream of the turbine, and the bypass line branches off to the exhaust gas recirculation line, or
b) the bypass line branches off upstream of the turbine, and the exhaust gas recirculation line branches off to the bypass line, wherein
c) at least one particle filter is arranged in the exhaust gas recirculation line or in the bypass line upstream of the exhaust gas recirculation line or in the exhaust gas line upstream of the exhaust gas recirculation line or the bypass line respectively, wherein, for the purpose of higher load operation of the gasoline engine, the bypass line and, simultaneously, the exhaust gas recirculation line can be acted on with exhaust gas.

If the bypass line branches off to the exhaust gas recirculation line, the branch-off is preferably downstream of the particle filter of the exhaust gas recirculation line. This allows for the bypass line to be supplied likewise with the particle filter.

The exhaust gas conducting system described herein comprises at its core an exhaust gas recirculation system (EGR system). An EGR system is, as a rule, composed of at least an exhaust gas recirculation line (EGR line), an exhaust gas recirculation cooler (EGR cooler), and an exhaust gas recirculation flap valve (EGR valve).

In the EGR system and in the induction system of gasoline engines, deposits are to be observed, which are referred to as "wet soot" or "fouling", which can have serious consequences such as reduced cooling effect, blockages, poor distribution, and irregular combustion. Accordingly, hitherto EGR systems have only rarely been used with gasoline engines, and with restrictions.

In principle, as also within the framework of this patent application, a distinction is made between three operational zones of an engine, the higher load operation, the part-load operation, and overrun operation. The higher load operation is further subdivided into a full-load operation and a high-load operation, although this is not of any further significance for the present patent application.

Starting from part-load operation, load operation is reached when the engine, due to an increase in the load, and without further measures such as, in particular, an exhaust gas recirculation as described here, would reach the knock limit, whereupon knocking would set in. Below part-load operation is overrun operation, within which the engine does not provide the vehicle with any drive performance, or none worth mentioning.

In the case of EGR systems for gasoline engines, a cooling of the recirculated exhaust gas is advantageous for the optimization of the combustion, since a recirculation of non-cooled exhaust gases, in particular at higher loads, including during high-load operation and full-load operation, leads to higher induction temperatures due to the hot exhaust gases being supplied. This in turn results in filling losses and an increase in the knock inclination of the gasoline engine. This is associated with undesirable engine performance losses. These disadvantages can be reduced by the cooling of the recirculated exhaust gas. This, however, results in the occurrence of an increased quantity of condensates, consisting of water and/or hydrocarbons or hydrocarbon compounds, and incompletely combusted combustion residues in the recirculated exhaust gas, which leads to an increased degree of sootiness in the form of wet adhesive deposits in the EGR system as well as in the induction air system. Accordingly, a combination of the particle filter with the charge-air cooler, such as is described according to EP 2 194 351 B1 for a diesel particle filter, does not come into consideration for avoiding the risk of blockage due to the deposits in the particle filter described heretofore.

Moreover, a particle filter only reaches the minimum temperature in the particle filter required for the self-regeneration of the particle filter only in a very specifically restricted operational range. In this case, additional active regeneration measures are required, which are disadvantageous with regard to operational and costs considerations. By contrast with the wet constituents which are also conveyed in gasoline exhaust gas, diesel particles are drier constituents which can have a lesser inclination to condensation and clotting. Moreover, active regeneration measures for the particle filter in the case of the diesel engine, due to the lower exhaust gas temperatures which prevail there, are generally necessary in very wide ranges of engine operation.

Particle filters for gasoline engines, like diesel particle filters, retain particles. For the regeneration of the particle filter, i.e. for the burning off of filtered particles, sufficiently high exhaust gas temperatures and an oxygen surplus are required. After a warm-up phase, the first precondition referred to with regard to the exhaust gas properties are available in EGR systems of gasoline engines, namely sufficiently high exhaust gas temperatures. In wide operational ranges of the gasoline engine, i.e. in the fired state (lambda=1 in the case of stoichiometrically operated gasoline engines), however, an oxygen surplus is absent, as a basis for a complete combustion of the particles in the particle filter. Therefore, particles are only conveyed by the exhaust gas flow to the particle filter, they are in part combusted there with the residual oxygen available and in part retained there until sufficiently good burning-off conditions are available for complete burning-off. A regeneration, namely a combustion of the particles, can only take place in deceleration phases of the engine when the injection is switched off. In this deceleration phase, i.e. with the engine still turning over, and intake and outlet valve actuation and with the EGR valve open, oxygen passes into the EGR system and flows through the particle filter integrated there. If there is a sufficient temperature in the particle filter, the particles are then combusted to form $CO_2$. Under certain circumstances, CO, HC and/or NOx are also formed.

In deceleration operation, the EGR valves in the gasoline engine are usually closed, such that, in the event of a renewed load requirement from the driver or on attaining the idling speed of the engine, the ignition of the engine, which has to take place immediately is not jeopardized by a possibly small amount of residual gas which may still be present.

However, in order to make possible a regeneration of the particle filter in the EGR line, the opening of the EGR valve is necessary, for example in deceleration operation. This allows exhaust gas with a high oxygen portion to flow through the particle filter and regenerate it. This regeneration continues until the particles or the exhaust gas respectively, due to the cooler air in deceleration operation, fall below the minimum temperature required for the regeneration. At this moment at the latest, the EGR valve could then be closed in order to guarantee the restart of engine combustion which is to take place. However, it is not known when a renewed load requirement from the driver will take, place.

Thanks to the bypass line according to the disclosure, a regeneration of the particle filter in the EGR line is possible even when the EGR valve is closed. The bypass line branches off downstream of the particle filter and, if a turbocharger is used, preferably opens into the exhaust gas line after the turbine outlet.

On opening the bypass line, the part of the exhaust gas flow conveyed through the exhaust gas turbine is reduced. This is the case, in particular, if the pressure drop over the turbocharger is greater than that over the EGR bypass stretch. A corresponding part of the exhaust gas can be conveyed, when the EGR line is closed, through the particle filter and the bypass line. Accordingly, the regeneration of the particle filter is also favoured in phases with the EGR valve closed, for example in deceleration operation.

Moreover, in comparison with flow-through only with the EGR valve open, the oxygen-rich exhaust gas flow conveyed through the particle filter is significantly increased and the regeneration intensified.

It is therefore no longer necessary for the regeneration of the particle filter to be prevented before the renewed start of the engine. The regeneration can equally well last as long as is necessary for a regeneration phase in deceleration operation of a particle filter installed in the main exhaust gas flow. The regeneration which is therefore made possible may even exceed in its effectiveness that of a particle filter installed downstream in the main exhaust gas flow, since with the installation situation close to the engine, routed parallel to the turbocharger, a higher thermal imposition on the particle filter takes place. This results in the temperature of the particles in the particle filter being higher, for example in the phase of deceleration switch-off, and the regeneration more intensive.

In addition to this improved regeneration of the particle filter, there are further advantages inherent with the bypass line according to the disclosure.

By way of the additionally switchable bypass line, a part of the exhaust gas is conveyed past the exhaust gas turbine. Accordingly, the bypass line also takes on the function of a wastegate valve, such as has hitherto been integrated, with conventional turbochargers, in the housing of the turbine. Accordingly, the bypass line can be used not only in the deceleration state, but also in higher load operation, such as under maximum load conditions of the gasoline engine, if the exhaust gas energy exceeds the necessary drive energy for the compressor of the exhaust gas turbocharger. In this case too, due to the residual oxygen contained in the exhaust gas and the high exhaust gas temperature, the particle filter can be regenerated. It is of course also possible, although not necessary, for the additional switchable bypass line to be used in combination with a turbocharger having a wastegate function.

In addition to this, further advantages are inherent with the bypass line according to the disclosure, in particular in the start or cold start phase of the engine.

The bypass line can also be opened in the situation of an engine start. During and after the engine start or engine cold start, the charge function of the turbocharger is not yet present, since the exhaust gas energy is too low for this at these operation points. On the contrary: the exhaust gas turbine represents a flow resistance which impairs the engine operation. Accordingly, if required, the exhaust gas flow can be conducted via the particle filter of the EGR stretch and the bypass line, past the turbine. In the case of a coated particle filter in the EGR stretch, in this way, close to the engine, not only are particles retained, but also, due to the engine exhaust gas which is hotter here, an earlier response is attained of the coating on the particle filter, and therefore an earlier converting of non-combusted products of combustion. The flow resistance of the exhaust gas turbine can be influenced by a suitable measure, e.g. an additional regulatable exhaust gas flap valve, in the main exhaust gas system, before the introduction of the bypass flow.

In addition to the air quantity required for the regeneration, it may be necessary for the exhaust gas temperature to be specifically increased, in order to attain the exhaust gas temperature required for the regeneration. For this, measures known from the prior art come into consideration, such as ignition timing delay, load point displacement, or heating.

The combination according to the disclosure of bypass line including bypass choke valve, and exhaust gas recirculation line including EGR valve, allows for an independent control of the exhaust gas volume flow in the bypass line, on the one hand, and in the exhaust gas recirculation line on the other. Both the EGR valve and the bypass choke valve can be controlled independently of one another so that the exhaust gas volume flow conveyed by them can be controlled accordingly.

It is therefore possible for the exhaust gas recirculation to be used in higher load operation and in deceleration operation, while no exhaust gas recirculation takes place in part load operation. In the higher load operation, it is possible, simultaneously with the exhaust gas recirculation, for the bypass line function, consequently the wastegate function, to be fulfilled.

It can also be advantageous in this situation if the at least one particle filter is uncoated or if the particle filter has a catalytically acting coating for the conversion of CO, HC and/or NOx. A coating of the particle filter leads, in turn, to reduced contaminant emissions in the intake system, which can additionally advantageously influence the combustion. The coating of the particle filter takes effect with fired engine operation. The same applies to the filter effect of the particle filter. The regeneration of the particle filter can take place in deceleration operation. Thanks to the combination of particle filtering and catalytic conversion of further incomplete combustion products, the exhaust gas again conveyed to the engine has a high degree of purity, both with regard to the products of combustion as well as with regard to the particles. This has a positive effect on the avoidance of deposits in the intake system as well as on the combustion, and therefore on the contaminant emission and the degree of efficiency of the gasoline engine.

In connection with the configuration and arrangement according to the disclosure, it may be advantageous if, downstream of the particle filter, a cooler is provided inside the exhaust gas recirculation line. The cooler is separated from the particle filter spatially or at least thermally, such that the particle filter has, as far as possible, high temperatures in a wide range of engine operational states, in order that, if there is a sufficient oxygen surplus, it regenerates in the exhaust gas due to oxidation of the filtered constituents. Accordingly, the greatest possible working range of the particle filter for the regeneration is achieved. The cooler is configured either as an exhaust gas cooler, as an exhaust gas engine cooling water cooler, or as an exhaust gas low-temperature cooling water cooler. In special embodiments, several coolers of the exhaust gas recirculation, which can also be configured as being capable of being switched on, are arranged in series or also in parallel.

It can be advantageous, in particular, if the cooler has on the outlet side an exhaust gas nominal temperature Ta, which lies above the dewpoint of the substances contained in the exhaust gas, for example $250°\text{ C.}\geq Ta \geq 100°\text{ C.}$ or $250°\text{ C.}\geq a \geq 105°\text{ C.}$ The exhaust gas nominal temperature Ta is, in this situation, selected sufficiently high such that condensing of the water contained in the exhaust gas is prevented. This condition should apply to a large part of the operational states. Accordingly, an excessive condensation or contamination respectively of the EGR system can be prevented. Cooling to below 100° C. first takes place in the second cooling step after the mixing of exhaust gas and fresh air in the inlet line or charge-air line, shortly before entering the engine. As a result, condensing water can pass directly into the engine combustion chamber, and by evaporation can exert a positive effect on the engine combustion. As explained hereinafter, due to the particle filter, despite the further cooling of the charge air, there is a substantially lesser risk of sootiness with regard to the charge-air cooler close to the engine.

In this situation provision can advantageously be made for the inlet line upstream of the opening of the exhaust gas recirculation line to be configured as a fresh air line, and for at least one fresh air cooler and a fresh air choke flap valve to be provided in the fresh air line. By means of the fresh air cooler, a separate cooling of the fresh air can take place before the mixing with the exhaust gas. If the temperature level of the compressed fresh air at 150° C. to 160° C. is not yet so very high, the separate cooling of the fresh air can also be done without, wherein the fresh air/exhaust gas mixture can be cooled together, as described hereinafter.

It can further be advantageous if the fresh air cooler has on the outlet side a fresh air nominal temperature Tf of $150°\text{ C.}\geq Tf \geq 60°\text{ C.}$ The cooling effect applied in the fresh air system is in any event advantageous with regard to the coolest possible fresh air/exhaust gas mixture.

It can also be advantageous if the inlet line downstream of the opening of the exhaust gas recirculation line is configured as a charge-air line, and if at least one charge-air cooler is provided in the charge-air line. The cleaning of the recirculated exhaust gas by the particle filter guarantees the effective use of the charge-air cooler for the fresh air/exhaust gas mixture. The sootiness of the charge-air cooler is effectively reduced due to the use of the particle filter. The effect that, due to the particle filter in the EGR line, soot particles can be significantly reduced, and due to the EGR the exhaust gas temperature can be significantly reduced in high-load operation, can be enhanced by the more intensive EGR and charge-air cooling to the point that the suction intake temperature can be lowered, before the cylinder inlet, to the level of gasoline engines without EGR. As a result, the knock inclination of the gasoline engine is significantly reduced, and significant consumption improvements can be achieved. This is attained by the two-step or three-step cooling of the sucked in charge air by the EGR cooler, the charge-air cooler, and, if applicable, the fresh-air cooler, with the application of the different temperature levels.

The branching off of the EGR line upstream of the turbine guarantees higher exhaust gas temperatures, which have an overall positive effect on the particle filter regeneration and the contaminants reduction. The opening downstream of the compressor has the advantage that the regulating stretch is shorter. This combination of branching off upstream of the turbine and opening downstream of the compressor is referred to as high-pressure EGR (HP-EGR). It may be, however, that there will not be a sufficiently high pressure drop in all the desired operational states between the exhaust gas system and the intake suction system for the supply of the desired recirculated exhaust gas quantity. In the event that an additional cooling of the recirculated exhaust gas is required, the purified exhaust gas can also be supplied to the intake suction system downstream of the compressor and upstream of the charge-air cooler. As a result, the exhaust gas is cooled not only in the EGR cooler, but additionally also in the charge-air cooler. Also conceivable is an arrangement in which the charge-air cooler is designed so effectively that no EGR cooler is required for the recirculated exhaust gas in the EGR line.

The branching off upstream of the turbine in combination with the opening upstream of the compressor is referred to as maximum-pressure EGR (MP-EGR), and guarantees a large pressure difference inside the EGR line even for greater requirements of exhaust gas recirculating quantities. However, as a result, the regulating stretch is longer than in the case of the HP-EGR and the compressor and the turbine must, if necessary, be adapted to the modified mass throughput values.

The branching off downstream of the turbine in combination with the opening upstream of the compressor is referred to as low-pressure-EGR (LP-EGR).

To this end, it can be advantageous if the charge-air cooler has on the outlet side a charge air nominal temperature Tu, with Tu<=60° C. Due to the intensive cooling of the charge air, the exhaust gas temperature of the gasoline engine can be reduced to the level of diesel engines (about 850° C.). This has a very positive effect on the knock inclination of the gasoline engine, and significant improvements in fuel consumption are possible. The minimum attainable charge air nominal temperature Tu is always dependent on the temperature of the cooling agent used for the cooling, i.e. the ambient air or the engine cooling water. The minimum attainable charge air nominal temperature Tu, for reasons of physical conditioning, is always above the temperature of the cooling agent.

It can additionally be advantageous if an EGR valve is provided in the exhaust gas recirculation line, by means of which an exhaust gas mass flow can be adjusted inside the exhaust gas recirculation line, depending on the operation point. The EGR valve is advantageously placed downstream of the particle filter. In deceleration phases of the engine, it is possible, by means of the EGR valve, to influence the regeneration of the particle filter by means of the quantity of fresh air being recirculated. A positioning upstream of the particle filter leads to increased contamination of the EGR valve, and is only considered in exceptional cases. In addition to this, it can be advantageous if the EGR valve is provided downstream of the cooler. This is therefore protected against excessive temperature loading.

It can also be advantageous if a bypass flap valve is provided in the bypass line, by means of which an exhaust gas mass flow inside the bypass line can be adjusted, depending on the operation point.

It can additionally be advantageous if an additional exhaust gas recirculation line having an additional EGR valve is provided, which branches off to the exhaust gas recirculation line or which branches off to the bypass line, wherein the additional exhaust gas recirculation line opens into the inlet line upstream of the compressor. Accordingly, the additional EGR line can be used as an alternative to the EGR line. It is also possible for both EGR lines to be used together.

It can further be advantageous if an exhaust gas catalytic converter is provided downstream of the turbine. The exhaust gas catalytic converter is preferably placed downstream of the opening of the bypass line. Due to the 3-way catalytic converter or the oxidation catalytic converter respectively, the advantages referred to heretofore, of reduced contaminant emissions, are attained in the main exhaust gas line.

Due to the fact that the exhaust gas which is to be recirculated is drawn off upstream of the catalytic converter of the exhaust gas system, it is possible, instead of a coated particle filter, for an additional 3-way catalytic converter or also an oxidation catalytic converter to be integrated in the exhaust gas recirculation line. However, these catalytic converters represent an additional structural component which can alternatively be avoided with a catalytically-coated particle filter. In any event, the oxidation of contaminant components leads to the development of heat, and therefore to the heating of the downstream particle filter. This extends the use of the independent regeneration of the particle filter in deceleration operation to further operational states.

In addition to this, provision can be made for the supply of secondary air, by means of which secondary air is introduced into the exhaust gas recirculation line and/or into the bypass line, and a corresponding device for this purpose. The secondary air can also be introduced into the exhaust gas line upstream of the exhaust gas recirculation line and/or upstream of the bypass line. A use of secondary air, with which the exhaust gas line, and therefore the particle filter, are supplied with additional oxygen for the regeneration, can also be advantageous. In this situation, however, it must be borne in mind that the additional air flow is actually also conveyed through the particle filter. Therefore, when using the secondary air pump, the EGR valve should be opened. Additionally or alternatively, the bypass line can also be opened. When the EGR valve is closed, however, the bypass line must be opened. The secondary air can be provided by way of a separate secondary air pump or by means of the charge-air compressor, inasmuch as the pressure level available will guarantee this. Depending on the requirement, this exhaust gas flow can be conveyed to the bypass line either before or after the catalytic converter of the exhaust gas system.

The object is also achieved by an exhaust gas system and/or a gasoline engine having an exhaust gas conducting system as described heretofore.

The object is also achieved by a method for operating a gasoline engine having an exhaust gas conducting system or an exhaust gas system as described heretofore, in which a) during the operation or during the deceleration operation of the gasoline engine with the EGR valve at least partially closed, at least a part of the exhaust gas flow is conveyed through the particle filter and through the at least partially opened bypass line, wherein a regeneration of the particle filter takes place or is made possible;

b) during and after the start of the gasoline engine, with an at least partially closed EGR valve, by opening the bypass choke flap valve at least a part of the exhaust gas flow is conveyed through the particle filter and through the bypass line past the turbine, until a predetermined state such as a predetermined exhaust gas pressure is reached and requires the closing of the bypass line;

c) during the higher load operation, i.e. during full-load operation or high-load operation, of the gasoline engine, the bypass line is used as a wastegate for conveying at least a part of the exhaust gas flow past the turbine, wherein this causes a regeneration of the particle filter to be carried out or made possible. In this situation, the EGR valve can be at least partially or entirely opened.

Thanks to the use of the bypass line according to the disclosure, the engine behaviour and the contaminant emission respectively at different operation points can be significantly improved.

It can be advantageous in this respect if, on the introduction of secondary air by the device, a) the EGR valve is opened, and, optionally, supplementary exhaust gas is conveyed through the bypass line, wherein the bypass choke flap valve is at least partially opened, or b) the EGR valve is closed and, alternatively, exhaust gas is conveyed through the bypass line, wherein the bypass choke flap valve is at least partially opened. The additionally introduced mass flow can be carried away via the bypass line or the EGR line. In the latter case, an improved regeneration of the particle filter is guaranteed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the disclosure are explained in the claims and in the description and represented in the figures, wherein:

Corresponding reference numerals indicate corresponding parts throughout the several views of the drawings.

DETAILED DESCRIPTION

Example embodiments will now be described more fully with reference to the accompanying drawings.

Figure 1:
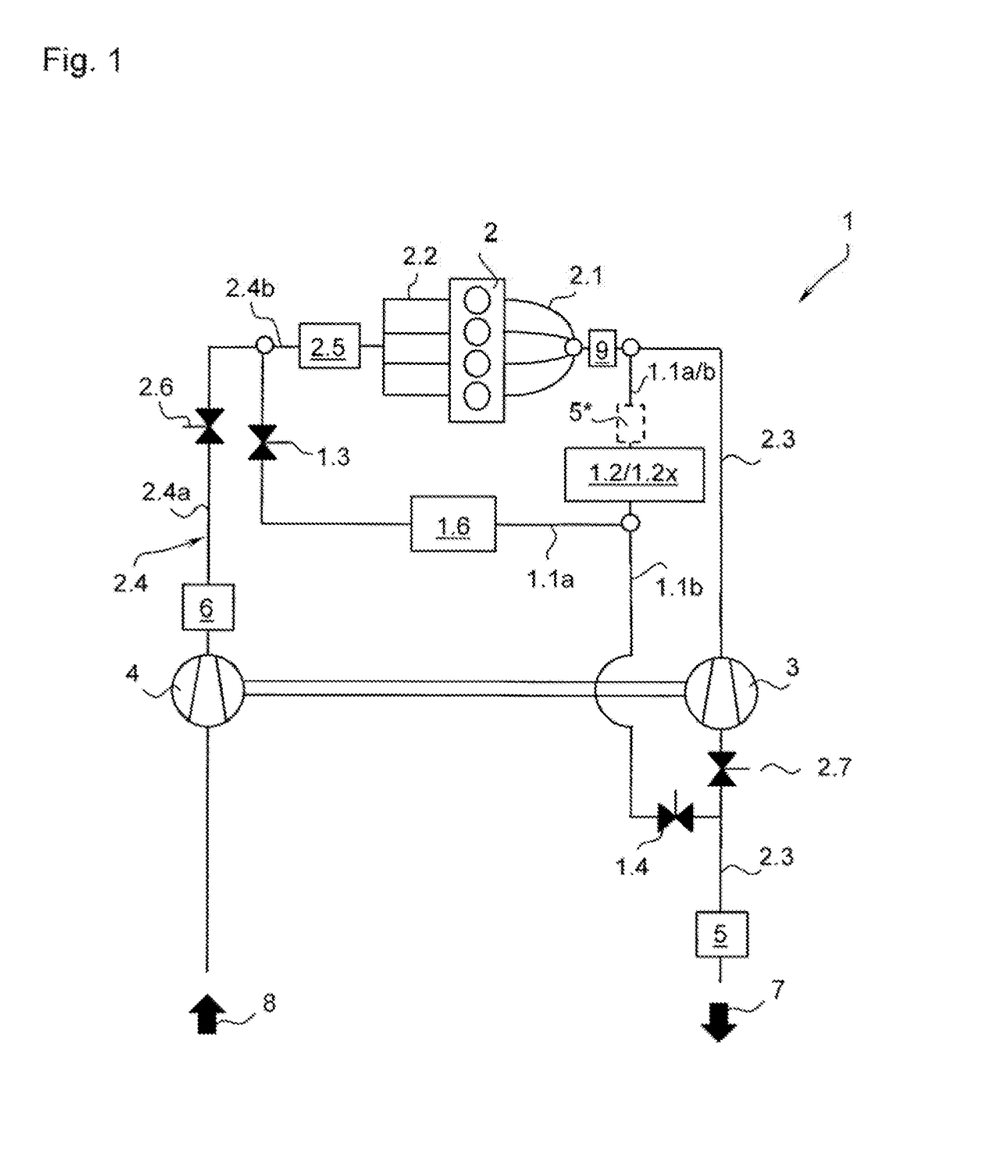
FIG. 1 shows a principle sketch of an HP-EGR having a bypass line.
Figure 2:
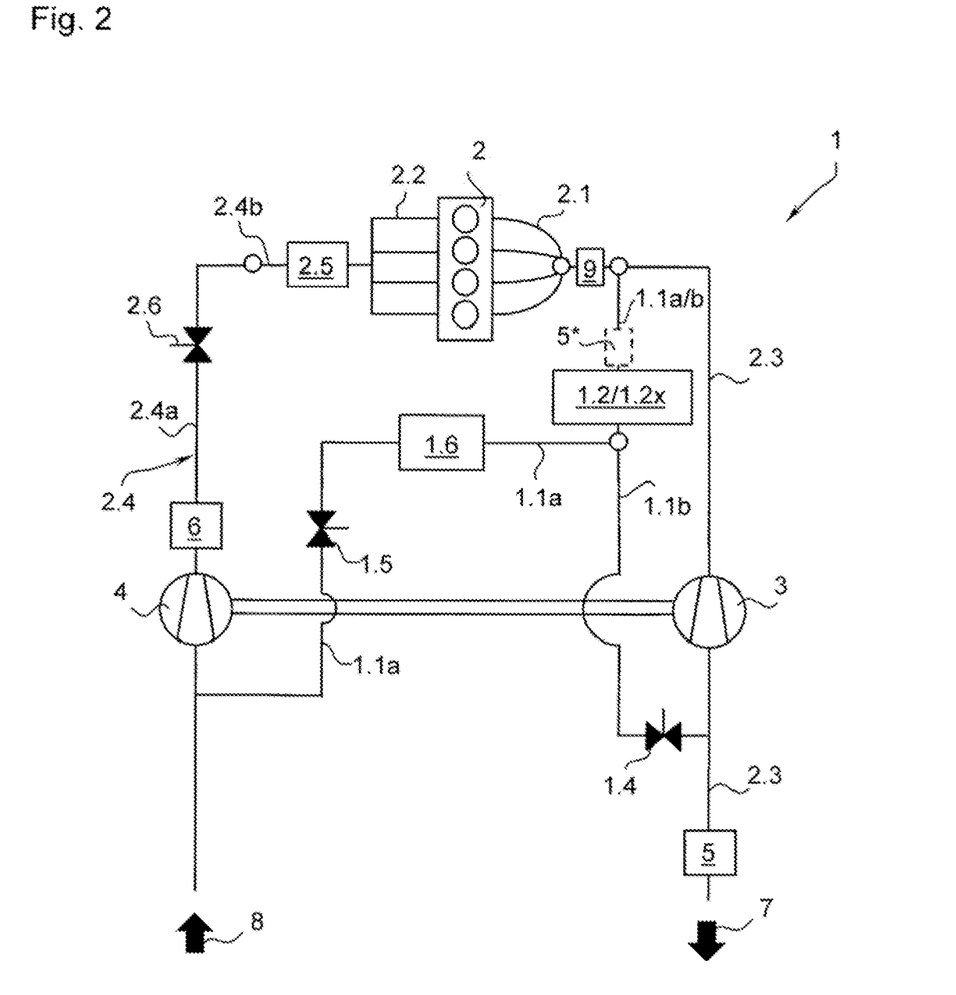
FIG. 2 shows a principle sketch of an MP-EGR having a bypass line.
Figure 3:
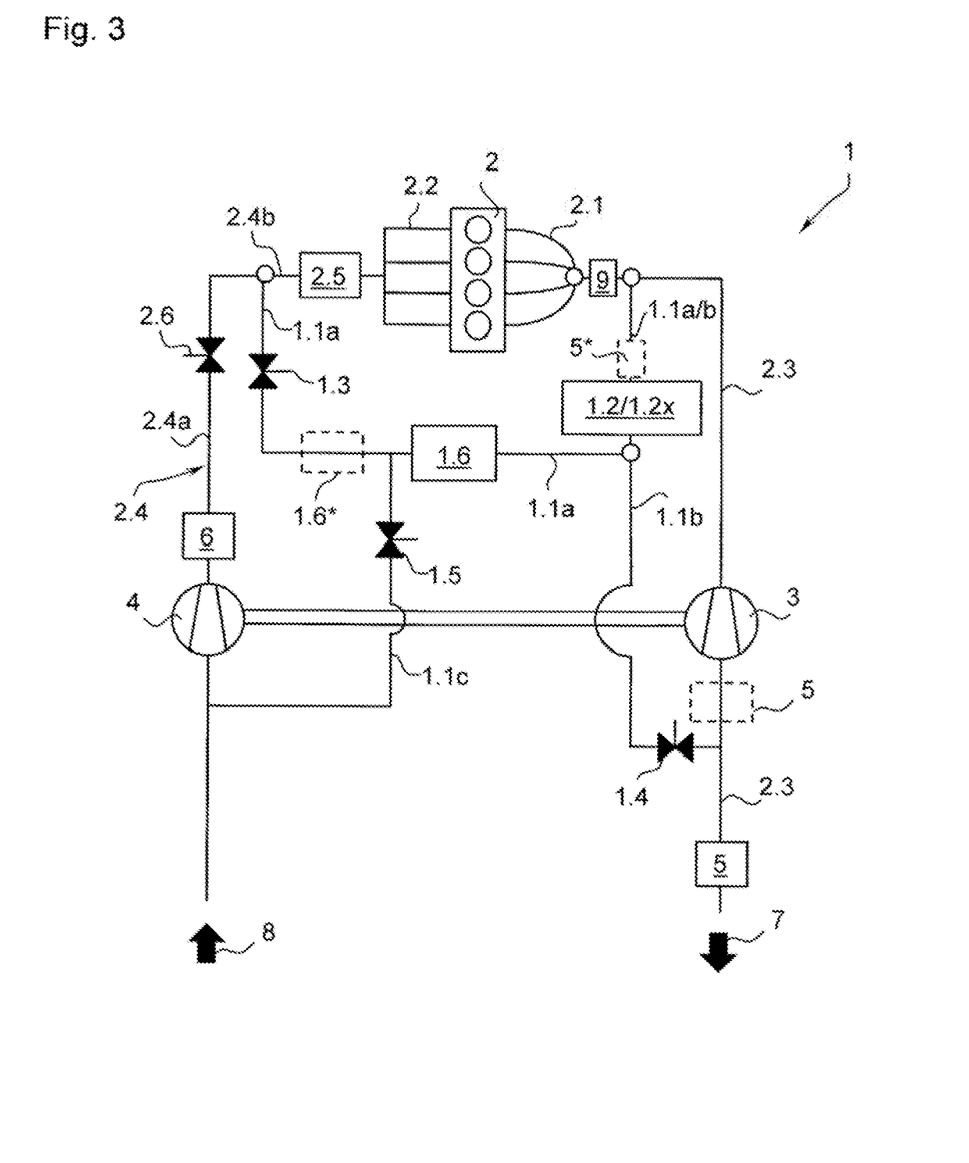
FIG. 3 shows a principle sketch of a combined HP and MP-EGR having a bypass line.

Represented in all the principle sketches according to FIGS. 1-3 is an exhaust gas conducting system 1 (EGR system), which is integrated into the exhaust gas system and charge-air system of a gasoline engine 2 having an exhaust manifold 2.1 and intake manifold 2.2, and having an exhaust gas turbine 3 and charge-air compressor 4. The exhaust gas system and charge-air system has an exhaust gas line 2.3 which is connected to the exhaust manifold 2.1 of the gasoline engine 2, into which exhaust gas line the turbine 3 is integrated. At the end of the exhaust gas line 2.3, exhaust gas 7 leaves the exhaust gas conducting system 1 and flows into the additional exhaust gas stretch, not shown. In addition, an inlet line 2.4 is provided which is connected to the intake manifold 2.2 of the gasoline engine 2, into which inlet line the compressor 4 is integrated. The inlet line 2.4 is supplied with fresh air 8 by means of an air supply system, not represented. In addition, at least one exhaust gas recirculation line 1.1a (EGR line) having an EGR valve 1.3 is provided, which branches off to the exhaust gas line 2.3, and opens into the inlet line 2.4. Optionally provided downstream of the turbine 3 and upstream of the opening of a bypass line 1.1b, according to FIG. 1, is an exhaust gas flap valve 2.7, by means of which the flow resistance of the exhaust gas turbine 3 can be influenced.

As a supplement to this, the bypass line 1.1b is provided, which likewise branches off to the exhaust gas line 2.3 and opens downstream of the turbine 3 into the exhaust gas line 2.3. In this situation, it is not of significance whether the bypass line 1.1b branches off to the exhaust gas recirculation line 1.1a or whether the exhaust gas recirculation line 1.1a branches off to the bypass line 1.1b. The bypass line 1.1b has a bypass choke flap valve 1.4 for regulating the gas mass flow.

Both the EGR valve 1.3 and the bypass choke flap valve 1.4 are arranged downstream of the particle filter 1.2, 1.2x.

Arranged in the EGR line 1.1a is a particle filter 1.2, 1.2x which filters the exhaust gas 7 which has been recirculated or is to be recirculated. The particle filter 1.2x can be coated, and can fulfil the functions of a 3-way catalytic converter or at least an oxidation catalytic converter. As an alternative, the particle filter 1.2 can also be uncoated. In this case, an exhaust gas catalytic converter 5* may be necessary, which is, for example, placed upstream of the particle filter 1.2 (represented by broken lines), in order to guarantee a catalytic cleaning of the recirculated exhaust gas 7.

Additionally provided in the EGR line 1.1a downstream of the particle filter 1.2, 1.2x is at least one EGR cooler 1.6. Downstream of the respectively EGR cooler 1.6 or upstream of the opening into the inlet line 2.4 is an EGR valve 1.3 for regulating the mass flow inside the EGR line 1.1a.

Provided in the inlet line 2.4 is a charge-air or fresh air choke flap valve 2.6, upstream of the introduction point of the exhaust gas recirculation line 1.1a into the inlet line 2.4. This part of the inlet line 2.4 is also referred to as the fresh air line 2.4*a*. Also provided inside the fresh air line 2.4*a* is a charge-air or fresh air cooler 6.

Provided downstream of the turbine 3, in the exhaust gas line 2.3, is a catalytic converter 5 which is configured as a 3-way catalytic converter or as an oxidation catalytic converter. Irrespective of the exemplary embodiments described hereinafter, the catalytic converter 5 used in each case can in principle be a 3-way catalytic converter or an oxidation catalytic converter. An oxidation catalytic converter 5 is considered, in particular, if the gasoline engine 2 is a lean combustion configuration.

As a supplement to the EGR cooler 1.6 and to the fresh air cooler 6, placed in the inlet line 2.4 downstream of the introduction point of the exhaust gas recirculation line 1.1*a* is a charge-air cooler 2.5. This part of the inlet line 2.4 downstream of the introduction point of the exhaust gas recirculation line 1.1*a* is also referred to as the charge-air line 2.4*b*.

Additionally provided on the exhaust gas side is a device 9 for introducing secondary air into the cylinder head or into the exhaust manifold 2.1 or into the exhaust gas line 2.3.

In principle, a distinction is made between three variants of the exhaust gas recirculation, depending on the branching off of the EGR line 1.1*a* from the exhaust gas line 2.3 and the opening of the EGR line 1.1*a* into the inlet line 2.4.

The combination of branching off of the EGR line 1.1*a* upstream of the turbine 3 and opening of the EGR line 1.1*a* downstream of the compressor 4 is referred to as high-pressure EGR (HP-EGR).

The combination of branching off of the EGR line 1.1*a* upstream of the turbine 3 and opening of the EGR line 1.1*a* upstream of the compressor 4 is referred to as maximum-pressure EGR (MP-EGR).

The combination of branching off of the EGR line 1.1*a* downstream of the turbine 3 and opening upstream of the compressor 4 is referred to as low-pressure EGR (LP-EGR).

Represented in the diagram according to FIG. 1 is an HP-EGR, formed by the EGR line 1.1*a*, which branches off upstream of the turbine 3 and opens downstream of the compressor 4. The opening is downstream of the charge-air or fresh air choke flap valve 2.6.

An MP-EGR is configured in accordance with FIG. 2.

In the exemplary embodiment according to FIG. 3, an HP-EGR and an MP-EGR are combined. Downstream of the cooler 1.6, an additional EGR line 1.1*c* having an additional EGR valve 1.5, branches off to the bypass line 1.1*b*. Provided in the EGR line 1.1*c* is an additional EGR valve 1.5. The EGR line 1.1*c* opens into the inlet line 2.4 upstream of the compressor 4. An EGR cooler 1.6\* can, as an alternative, also be positioned downstream of the branching off for the additional EGR line 1.1*c*. The bypass line 1.1*b* can also open downstream of the catalytic converter 5 (represented by broken lines). This also applies to the exemplary embodiments according to FIG. 1 and FIG. 2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An exhaust gas conducting system for a gasoline engine, comprising an exhaust gas line adapted to be connected to an exhaust manifold of the gasoline engine, an inlet line adapted to be connected to an intake manifold of the gasoline engine, and a turbine which is arranged in the exhaust gas line,
   wherein
   at least one exhaust gas recirculation line having an EGR valve is provided which opens into the inlet line, and that the exhaust gas line has at least one bypass line with a bypass choke flap valve, which opens into the exhaust gas line downstream of the turbine, wherein
   a) the at least one exhaust gas recirculation line branches off upstream of the turbine, and the at least one bypass line branches off to the at least one exhaust gas recirculation line, or
   b) the at least one bypass line branches off upstream of the turbine, and the at least one exhaust gas recirculation line branches off to the at least one bypass line, wherein
   c) at least one particle filter is arranged in the at least one exhaust gas recirculation line or in the at least one bypass line upstream of the at least one exhaust gas recirculation line or in the exhaust gas line upstream of the at least one exhaust gas recirculation line, wherein,
   d) an exhaust gas flap valve is positioned within the exhaust gas line downstream of the turbine and upstream of an opening to the at least one exhaust gas recirculation line or the at least one bypass line to influence a flow resistance of the exhaust gas turbine, wherein for the purpose of higher load operation of the gasoline engine, the at least one bypass line and simultaneously the at least one exhaust gas recirculation line are acted on with exhaust gas, wherein the at least one particle filter has a catalytically acting coating for the conversion of CO, HC and NOx and an exhaust gas catalytic converter configured as 3-way catalytic converter is provided downstream of the turbine.

2. The exhaust gas conducting system according to claim 1,
   wherein a cooler is provided inside the at least one exhaust gas recirculation line downstream of the at least one particle filter.

3. The exhaust gas conducting system according to claim 1,
   wherein the inlet line upstream of the opening of the at least one exhaust gas recirculation line is configured as a fresh air line, and that at least one fresh air cooler and one fresh air choke flap valve are provided in the fresh air line.

4. The exhaust gas conducting system according to claim 1,
   wherein the inlet line downstream of the opening of the at least one exhaust gas recirculation line is configured as a charge-air line, and that at least one charge-air cooler is provided in the charge-air line.

5. The exhaust gas conducting system according to claim 1,
   wherein the EGR valve is provided in the at least one exhaust gas recirculation line that, depending on an operation point of the gasoline engine, adjusts an exhaust gas mass flow inside the at least one exhaust recirculation line.

6. The exhaust gas conducting system according to claim 1,
   wherein the bypass choke flap valve is provided inside the at least one bypass line that, depending on an operation point of the gasoline engine, adjusts an exhaust gas mass flow inside the at least one bypass line.

7. The exhaust gas conducting system according to claim 1, wherein an additional exhaust gas recirculation line having an additional EGR valve is provided, which branches off to the at least one exhaust gas recirculation line or branches off to the at least one bypass line, wherein the additional exhaust gas recirculation line opens into the inlet line upstream of a compressor.

8. The exhaust gas conducting system according to claim 1, wherein a device is provided for introducing secondary air into the at least one exhaust gas recirculation line and/or into the at least one bypass line.

9. A gasoline engine having an exhaust gas conducting system according to claim 1.

10. A method for operating a gasoline engine having an exhaust gas conducting system comprising an exhaust gas line adapted to be connected to an exhaust manifold of the gasoline engine, an inlet line adapted to be connected to an intake manifold of the gasoline engine, and a turbine which is arranged in the exhaust gas line,
wherein
at least one exhaust gas recirculation line having an EGR valve is provided which opens into the inlet line, and that the exhaust gas line has at least one bypass line with a bypass choke flap valve, which opens into the exhaust gas line downstream of the turbine, wherein
a) the at least one exhaust gas recirculation line branches off upstream of the turbine, and the at least one bypass line branches off to the at least one exhaust gas recirculation line, or
b) the at least one bypass line branches off upstream of the turbine, and the at least one exhaust gas recirculation line branches off to the at least one bypass line, wherein
c) at least one particle filter is arranged in the at least one exhaust gas recirculation line or in the at least one bypass line upstream of the at least one exhaust gas recirculation line or in the exhaust gas line upstream of the at least one exhaust gas recirculation line, wherein,
for the purpose of higher load operation of the gasoline engine, the at least one bypass line and simultaneously the at least one exhaust gas recirculation line are acted on with exhaust gas, wherein the at least one particle filter has a catalytically acting coating for the conversion of CO, HC and NOx and an exhaust gas catalytic converter configured as 3-way catalytic converter is provided downstream of the turbine, wherein
d) during an operation of the gasoline engine, with the EGR valve in a partially open position, at least a part of the exhaust gas flow is conveyed through the at least one particle filter and through the at least one bypass line, wherein a regeneration of the at least one particle filter takes place;
e) during and after the start of the gasoline engine, with the EGR valve at least partially closed, by opening the bypass choke flap valve, at least a part of the exhaust gas flow is conveyed through the at least one particle filter and through the at least one bypass line past the turbine, until a predetermined state requires the closing of the at least one bypass line;
f) during the higher load operation of the gasoline engine, the at least one bypass line is used as a wastegate for conveying at least a part of the exhaust gas flow past the turbine, wherein a regeneration of the at least one particle filter is carried out.

11. The method according to claim 10, further including introducing secondary air into the at least one exhaust gas recirculation line and/or into the at least one bypass line by a device while simultaneously
a) opening the EGR valve and conveying exhaust gas through the at least one bypass line, or
b) closing the EGR valve and conveying exhaust gas through the at least one bypass line.

12. The method according to claim 10, further including introducing secondary air into the EGR line.

13. The method according to claim 11, wherein the secondary air is introduced into the EGR line.

14. A gasoline engine having an exhaust gas conducting system comprising an exhaust gas line adapted to be connected to an exhaust manifold of the gasoline engine, an inlet line adapted to be connected to an intake manifold of the gasoline engine, and a turbine which is arranged in the exhaust gas line,
wherein
at least one exhaust gas recirculation line having an EGR valve is provided which opens into the inlet line, and that the exhaust gas line has at least one bypass line with a bypass choke flap valve, which opens into the exhaust gas line downstream of the turbine, wherein
a) the at least one exhaust gas recirculation line branches off upstream of the turbine, and the at least one bypass line branches off to the at least one exhaust gas recirculation line, or
b) the at least one bypass line branches off upstream of the turbine, and the at least one exhaust gas recirculation line branches off to the at least one bypass line, wherein
c) at least one particle filter is arranged in the at least one exhaust gas recirculation line or in the at least one bypass line upstream of the at least one exhaust gas recirculation line or in the exhaust gas line upstream of the at least one exhaust gas recirculation line, wherein,
for the purpose of higher load operation of the gasoline engine, the at least one bypass line and simultaneously the at least one exhaust gas recirculation line are acted on with exhaust gas, wherein the at least one particle filter has a catalytically acting coating for the conversion of CO, HC and NOx and an exhaust gas catalytic converter configured as 3-way catalytic converter is provided downstream of the turbine, wherein the inlet line upstream of the opening of the at least one exhaust gas recirculation line is configured as a fresh air line.

* * * * *